United States Patent
Williams et al.

[11] Patent Number: 5,549,949
[45] Date of Patent: Aug. 27, 1996

[54] FUME DUCT CIRCUMFERENTIAL JOINT SEALANT

[76] Inventors: Douglas Williams, 28 Waterside Cir., San Rafael, Calif. 94903; Jeff Shea, 708 Vermont St., San Francisco, Calif. 94107; Michael S. Cork, 2552 Honeysuckle, Richardson, Tex. 75082

[21] Appl. No.: 415,045

[22] Filed: Mar. 31, 1995

[51] Int. Cl.$^6$ .................... B32B 1/08; F16L 9/127
[52] U.S. Cl. ................ 428/36.9; 428/36.91; 428/413; 428/414; 156/330
[58] Field of Search .................. 428/36.9, 36.91, 428/138, 413; 285/31, 66, 397, 919; 138/155, DIG. 1, DIG. 2, DIG. 4, DIG. 5; 156/330

[56] References Cited

U.S. PATENT DOCUMENTS

| | | | |
|---|---|---|---|
| 3,712,649 | 1/1973 | Martin | 285/397 |
| 4,053,447 | 10/1977 | Shea | 524/594 |
| 4,076,873 | 2/1978 | Shea | 428/34.5 |
| 4,107,127 | 8/1978 | Shea | 260/38 |
| 4,200,480 | 4/1980 | Wolinski et al. | 156/294 |
| 4,268,659 | 5/1981 | Bederke et al. | 528/288 |
| 4,373,082 | 2/1983 | Kimball et al. | 528/60 |
| 4,608,300 | 8/1986 | Gruber | 428/285 |
| 5,202,189 | 4/1993 | Shea | 428/436 |
| 5,298,299 | 3/1994 | Shea | 428/34.5 |

OTHER PUBLICATIONS

H. Lee & K. Neville, Handbook of Epoxy Resins, March, 1967 pp. 7–2, 8–2, 13–1, 13–9, 13–16, 24–6.

*Primary Examiner*—Melvyn I. Marquis
*Assistant Examiner*—D. Aylward
*Attorney, Agent, or Firm*—Donald Diamond

[57] ABSTRACT

Sealant compositions for sealing the circumferential joint between pairs of dual-laiminate fume duct sections, and a joint sealing method enabling strong bonding between the sealant and phenolic/glass and vinyl ester surfaces without sanding mating surfaces. A first preferred sealant consists of a resin including by weight: 20.0% Epon 862 novolac epoxy resin; 30.0% SU-2.5 Epon novolac epoxy resin; 20.0% Heloxy 48; 19.5% Epon 826 bisphenol A resin; 10.0% Heloxy 505; and 0.5% silane, and a hardener including: two cycloaliphatic amines, 94.0%; and an aromatic tertiary amine, 6.0%. A second preferred sealant consists of a resin including by weight: 39.5% aromatic epoxide resin; 40.0% Heloxy 48; 20.0% SU-2.5 Epon novolac epoxy resin; and 0.5% silane, and a hardener including: two cycloaliphatic amines, 94.0%; an aromatic tertiary amine, 5.5%; and an amino silane, 0.5%.

14 Claims, 2 Drawing Sheets

FUME DUCT CIRCUMFERENTIAL JOINT SEALANT

BACKGROUND OF THE INVENTION

1. Field Of The Invention

The present invention relates to fume ducts and more particularly to novolac epoxy resin and hardener compositions which enable an improved method for assembling fume duct sections wherein a composition is used as a sealant in constructing a circumferential joint bond between pairs of adjoining duct section ends.

2. Description Of The Related Art

Ductwork for corrosive vapor exhaust systems is used extensively in many diverse industries which utilize hazardous chemicals to process raw materials or perform manufacturing procedures, such as the semiconductor industry, the plating industry, and the pharmaceutical industry. Such ductwork also is required in the many research and development laboratories which use highly reactive, toxic or otherwise hazardous chemicals in conducting experiments. Use of such chemicals not only can put personnel in the work environment at risk to hazardous fumes, but also are potential sources of contamination of industrial processes or laboratory experiments. Consequently, vapors from such chemicals must be exhausted through leak-proof air ducts to PATENT safely remove them from work areas. Duct installations can be very large, consisting of many thousands of feet of ductwork which may be manifolded and connected to multiple exhaust fans. Because of the wide diversity of chemicals used in industrial and research applications, it is extremely difficult to provide a single material for fabricating ductwork which can withstand all the chemicals to which duct interiors may be exposed. Materials which have been used heretofore to fabricate fume exhaust ductwork include black steel, galvanized steel and stainless steel, as well as plastic materials such as polyvinylchloride, polypropylene, coated materials, and fiberglass reinforced plastics (FRP's). Over the past forty years the trend in materials has been away from metals and coated metals and toward the use of plastics, particularly FRP's.

Various types of resins have been used in manufacturing FRP's including bisphenol fumarates, epoxies, chlorendic anhydrides, isopthalic or orthopthalic resins, and vinylester resins. Certain classes of resins are resistant to certain families of chemicals, but no single resin can resist all the chemicals used in industries such as semiconductor manufacturing. For example, polyesters generally have good resistance to acids and, to some degree, to caustics. However, they generally do not have good PATENT resistance to solvents, particularly halocarbons. Epoxies generally exhibit good resistance to caustics and solvents, but do not have good resistance to strong mineral acids. Various combinations of phenol/aldehyde resins have good resistance to most acids, but not to highly reactive combinations such as concentrated sulfuric acid and an oxidizer such as hydrogen peroxide. These resin systems also have poor resistance to liquid caustics. Thus, FRP resin compositions generally are poor choices for fume exhaust systems handling such types of materials.

In addition to the problem of providing a duct material capable of resisting broad classes of chemical vapors, there is also the problem of providing adequate resistance to fire. Unlike metallic ducts, plastic ducts exhausting chemicals which can react exothermically with themselves or with duct surfaces pose the risk of being set on fire. A problem common to all plastics has been flammability. Plastics can burn rapidly and produce much smoke, creating hazards of their own. The plastics industry often refers to certain classes of materials as "fire-retardant." Typically such materials incorporate heat absorbent fillers, heat sinks such as aluminum trihydrate, and most commonly, halogenated resin systems that include antimony or boron compounds which interfere with combustion at the interface between a plastic surface and ambient air by functioning as a free radical trap depriving the surface fuel of oxygen.

Resin systems and plastic fume exhaust ducts are described in U.S. Pat. Nos. 4,053,447; 4,076,873; and 4,107,127. In general, phenols and similar ring-structured molecules have excellent fire resistance characteristics and also generate low quantities of smoke. Fabrication costs are high for ducts made from phenolic resins because their curing generally requires heat and/or pressure. However, use of the phenol resorcinol in resin compositions can reduce or eliminate the necessity for using heat and pressure; some formulations can be cured at ambient (room) temperature.

As described generally in the above-cited references, various types of aldehydes when used in conjunction with resorcinol or phenol/resorcinol (PRF) combinations enable curing of FRP resins. An excess of aldehydes to the hydroxyl radicals contained within the mix is necessary. Paraformaldehyde, furfuraldehyde or other aldehydes can be used alone or in combination with various types of phenol/resorcinol mixes.

U.S. Pat. No. 5,298,299, which is incorporated in its entirety herein by reference, is directed to a composite fume duct having both good chemical resistance and good fire resistance properties. Ducts made in accordance with the invention described in that patent are generally tubular with a diametral size in the range of 2 inches to 84 inches, and have an inner laminate portion of chemically resistant material covered by and integral with an outer laminate portion of fire retardant material. The inner laminate is comprised of material such as fiberglass which is saturated with a chemically resistant resin such as a halogenated vinyl ester. The outer laminate which covers the inner laminate is similarly comprised of fabric or fiberglass material which is combined with a resorcinol or phenol/resorcinol type fire-retardant resin.

The dual-laminate duct is formed by first coating a mylar wrapped mandrel tool with the chemically resistant resin and then wrapping the mandrel with successive layers of fabric material saturated with the resin. The outer fire-retardant laminate is then formed directly over the inner laminate by applying successive layers of a suitable fabric material saturated with the fire-retardant resin. The composite duct structure is then allowed to cure and harden before being removed from the mandrel.

Ducts are fabricated as sections of standard length(s) which are transported to a job site and assembled there. Since a leak-proof joint is required between each pair of contiguous duct sections, even the smallest installation will have a considerable number of such joints. Therefore, reducing the time needed to assemble multi-section ductwork is significant to improving the profitability of businesses which install fume ducts. Because mechanical interfacing of section ends cannot by itself prevent leakage, a sealant must be applied circumferentially to each interface. Heretofore, the most time-consuming step in joining dual-laminate sections has been preparing the resin-impregnated surfaces to which the sealant must bond in order to effect a leak-proof seal. Specifically, these are surface areas near the ends of each duct section including: the opposed end portions of the inner laminate surface which is typically fiberglass saturated with a halogenated vinyl ester resin; the opposed end portions of the outer laminate surface which is typically fiberglass saturated with a phenol/resorcinol resin; and the exterior surfaces of a "slip" collar interposed internally between a pair of end sections, the collar surfaces typically being fiberglass saturated with a vinyl ester resin. Unless surfaces to be mated were first sanded, the interposing sealant layer would not adhere to the surfaces uniformly, resulting in porosities in the hardened sealant through which fumes could leak.

Each joint must not only prevent fumes from escaping during day-to-day operation, but also must maintain integrity after prolonged exposure to corrosive or otherwise reactive chemicals. Also, a joint must not fail catastrophically in the event a flame propagates through the ductwork or, if exposed directly to heat, become a source of smoke particulates or other contaminants.

Consequently, providing a sealant composition which facilitates joint assembly, withstands exposure to chemicals, and/or withstands exposure to flames is important to improving the state of the art of assembling and maintaining fume duct installations.

OBJECTS OF THE INVENTION

Accordingly, it is a primary object of the present invention to provide an improved method for joining fume duct sections.

Another object of the invention is to provide an improved method for joining fume duct sections wherein each section has an inner laminate of fabric material such as fiberglass impregnated with a halogenated chemically resistant resin, and an outer laminate of fabric material such as fiberglass impregnated with a fire-retardant resin of PRF type comprised of phenol/resorcinol with an excess of aldehydes.

A further object of the invention is to provide a sealant composition which can be applied directly to mating surfaces of duct fume joints without first requiring sanding of the surfaces.

Yet another object of the invention is to provide a fume duct sealant composition that does not contain volatile organic solvent and is smoke and flame retardant.

Other objects of the invention will become evident when the following description is considered with the accompanying drawings.

SUMMARY OF THE INVENTION

The above and other objects are met by the present invention which comprises sealant compositions for sealing the joint assembly between pairs of dual-laminate fume duct sections, and a joint assembly sealing method wherein high adhesive shear strength between mating joint surfaces is achieved without first sanding the surfaces. Each joint assembly includes two tubular fume duct section ends, each section including an inner fiberglass laminate impregnated with a halogenated resin and an outer fiberglass laminate impregnated with a PRF-type resin, and a fiberglass slip collar impregnated with a vinyl ester resin connecting the two section ends. A joint assembly may further include alternate layers of coarse and fine glass mesh saturated with sealant and wound around the joint seam.

Each sealant composition includes a resin component and a hardener (curing) component. Resins of this invention include novolac epoxy resin and mixtures of novolac epoxy resins wherein the resin has an average molecular weight from about 300 to about 3,000, an epoxide equivalent from about 125 to about 300, and functionality from about 1.8 to about 6.0.

Liquid hardener compositions which can be used to effect ambient cure of the novolac epoxy resins comprise primary, secondary and tertiary amines and mixtures thereof. Illustrative amines include 1,2-diaminocyclohexane, methylenedicyclohexylamine and aromatic tertiary amine.

Silanes may advantageously be incorporated into each component of a binary formulation to enhance the adhesive and bonding characteristics of the cured resin on a composite surface comprising resin and fiberglass. An illustrative silane which can be added to the resin component is γ-glycidoxypropyltrimethoxy silane. A suitable silane which can be added to the curing component is γ-aminopropyldimethoxy silane.

Flame and smoke retardants may be added to the resin component of the formulation. Illustrative flame retardants include pentabromodiphenyl oxide and decabromodiphenyl oxide.

There are no solvents in the binary formulation and no volatile organic compounds are evolved during the curing process. Accordingly, there is no outgassing when any of the resin systems described herein is used in the construction of a circumferential joint bond.

A first preferred sealant consists of a resin including by weight: 20.0% Epon 862 novolac epoxy resin; 30.0% SU-2.5 Epon novolac epoxy resin; 20.0% Heloxy 48; 19.5% Epon 826 bisphenol A resin; 10.0% Heloxy 505; and 0.5% silane, and a hardener including: two cycloaliphatic amines, 94.0%; and an aromatic tertiary amine, 6.0%.

A second preferred sealant consists of a resin including by weight: 39.5% aromatic epoxide resin; 40.0% Heloxy 48; 20.0% SU-2.5 Epon novolac epoxy resin; and 0.5% silane, and a hardener including: two cycloaliphatic amines, 94.0%; an aromatic tertiary amine, 5.5%; and an amino silane, 0.5%.

A more complete understanding of the present invention and other objects, aspects and advantages thereof will be gained from a consideration of the following description of the preferred embodiments read in conjunction with the accompanying drawings provided herein.

DESCRIPTION OF THE PREFERRED EMBODIMENTS

I. INTRODUCTION

Figure 1:
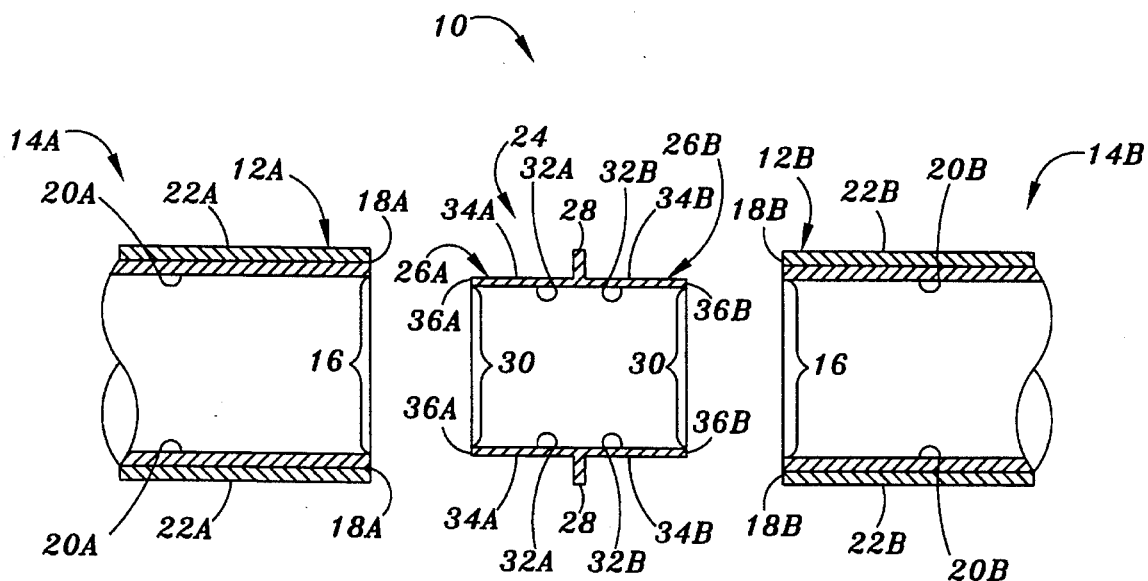
FIG. 1 is a cross-sectional view of components of a fume duct joint prior to assembly, including a collar disposed between opposed first and second dual-laminate duct section ends.

While the present invention is open to various modifications and alternative constructions, the preferred embodiments shown in the drawings will be described herein in detail. It is to be understood, however, there is no intention to limit the invention to the particular forms disclosed. On the contrary, it is intended that the invention cover all modifications, equivalences and alternative constructions falling within the spirit and scope of the invention as expressed in the appended claims.

II. DUCT JOINT PREPARATION AND ASSEMBLY

FIGS. 1–4 show sequential steps in assembling a fume duct joint assembly 10. Referring to FIG. 1, the joint assembly 10 includes end portions 12A, 12B, respectively, of first and second dual-laminate duct sections 14A, 14B, respectively, having a common generally tubular inner cross-sectional area 16, and, respectively, annular edges 18A, 18B, circumferential inner laminate surfaces 20A, 20B, and circumferential outer laminate surfaces 22A, 22B. Disposed between end portions 12A and 12B is a slip collar 24 including opposed first and second portions 26A, 26B, symmetric with respect to a circumferential rib 28 and having a generally tubular inner cross-sectional area 30 similar to but slightly smaller than the area 16 so that collar portions 26A, 26B can be closely received within end portions 12A, 12B, respectively. Collar portions 26A, 26B have, respectively, circumferential inner surfaces 32A, 32B, circumferential outer surfaces 34A, 34B, and annular edges 36A, 36B.

Figure 2:
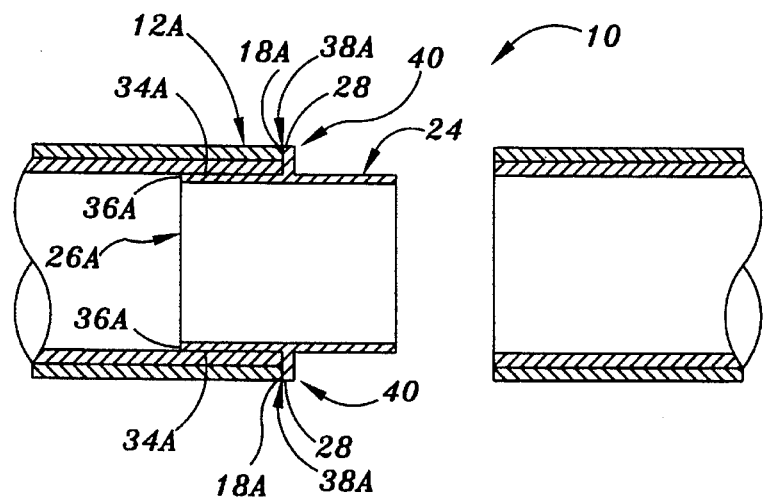
FIG. 2 is a cross-sectional view of the FIG. 1 joint components where the first section end is mated with the collar, and sealant is interposed between the mating surfaces.

FIG. 2 shows the collar portion 26A closely received within the section end portion 12A, insertion of collar 24 within end portion 12A being limited by the rib 28 seating against edge 18A, thus forming a first portion 38A of a circumferential seam 40. Prior to inserting collar portion 26A, a single-layer coat of a sealant 50 is applied to surface 34A and edge 36A by brushing, rolling or spraying. Sealant 50 comprises a curable mixture of novolac epoxy resin and amine hardener and may further include a filler such as polyethylene fibers to provide a putty-like viscosity.

Figure 3:
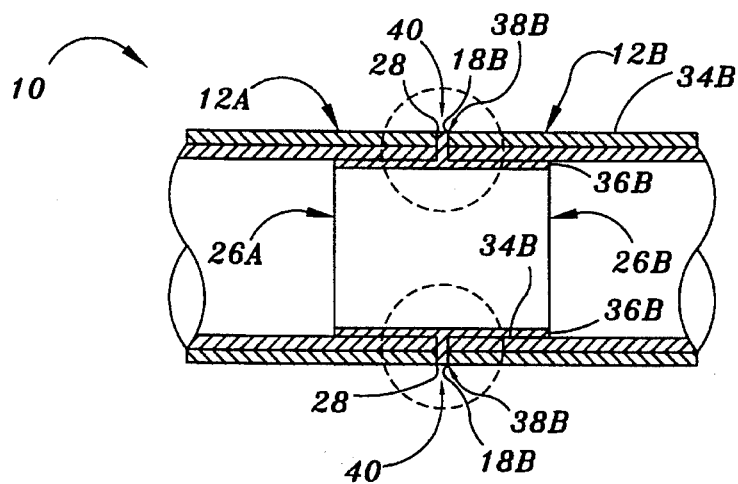
FIG. 3 is a cross-sectional view of the FIG. 1 joint components where the first and second section ends are mated with the collar, and sealant is interposed between the mating surfaces.

With collar portion 26A already fitted within end portion 12A, FIG. 3 shows collar portion 26B closely received within section end portion 12B, the rib 28 seating against edge 18B to form a second portion 38B of seam 40. Prior to inserting collar portion 26B, a single-layer coat of the sealant 50 is applied to surface 34B and edge 36B. Using a hot air gun (not shown), heat can be applied to joint assembly 10 to advance sealant curing.

Figure 4:
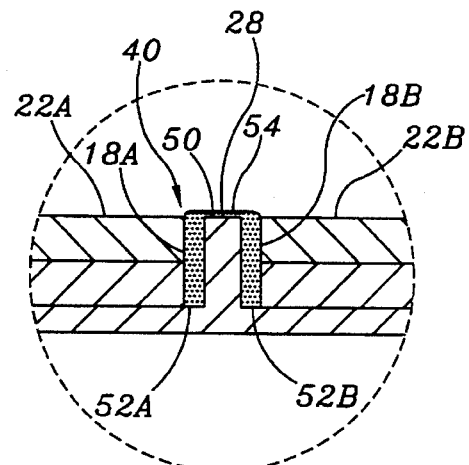
FIG. 4 is a detail view of the region bounded by each FIG. 3 dotted circle, after sealant has been applied into the circumferential joint seam including the section ends and collar rib.

As shown in FIG. 4, sealant 50 is then applied into the seam 40, flowing between first and second interstices 52A, 52B between collar rib 28 and duct section edges 18A, 18B, respectively. Sufficient sealant is applied to form a circumferential surface 54 which is even with outer surfaces 22A, 22B, thus sealing end portions 12A, 12B with a chemical-resistant barrier.

Figure 5:
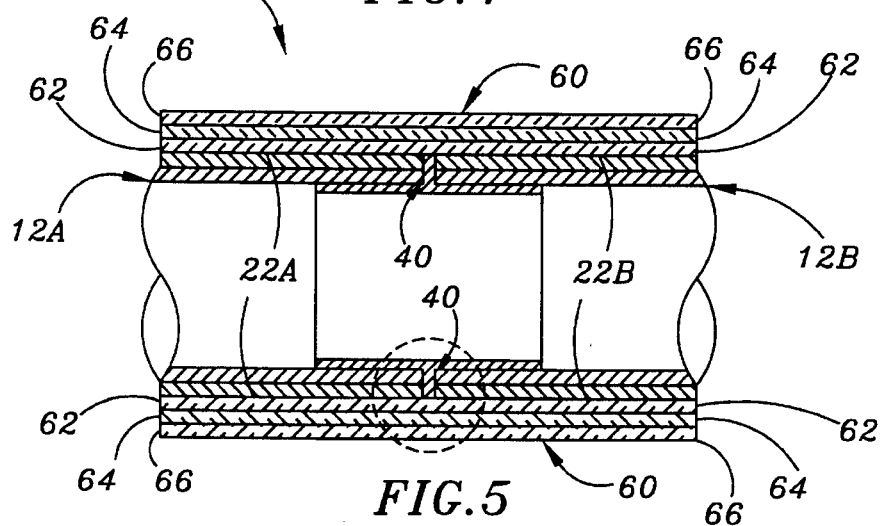
FIG. 5 is a cross-sectional view of the FIGS. 3, 4 joint after fine mesh, coarse mesh, and fine mesh fiberglass layers, each saturated with sealant, are successively wound around the joint seam.
Figure 6:
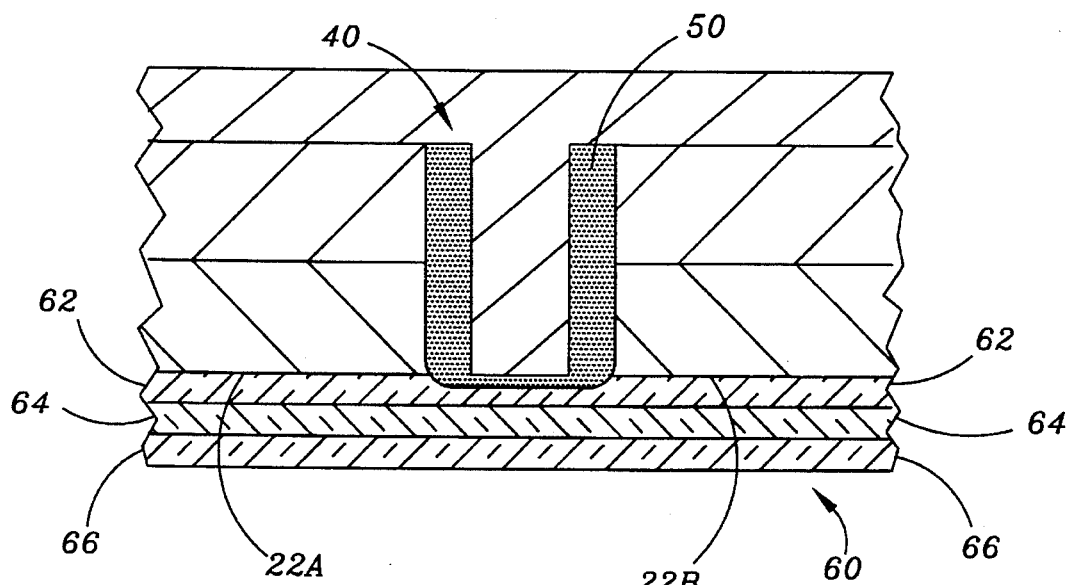
FIG. 6 is a detail view of the region bounded by the FIG. 5 dotted circle.

As shown in FIGS. 5 and 6, joint assembly 10 is reinforced with a "lay-up" bond 60 formed by tightly winding alternate layers of fine mesh (boat cloth, "B") fiberglass sheeting and coarse mesh (woven roving, "W") fiberglass sheeting around the seam 40. Firstly, the sheeting is cut in individual wraps to be applied completely around the joint circumference. Depending on duct diameter, wraps are each 4 to 8 inches wide and are applied unsanded, symmetric with respect to seam 40. Secondly, the resin component of sealant 50 is applied using a paint roller to outer surfaces 22A, 22B of duct end portions 12A, 12B, respectively, to "wet out" the surfaces. The layer of resin (not shown) should not be so thick as to cause excessive runs and drips. Thirdly, a first layer 62 of dry boat cloth is wound tightly around the joint, so that the cloth is pulled into seam 40. Using a paint roller the cloth outer surface then is wet out with the resin to smooth the joint and achieve a uniform surface. Fourthly, a layer 64 of dry woven roving is wound tightly around the layer 62 and then wet out in the same manner as layer 62. Fifthly, a second layer 66 of dry boat cloth is wound tightly around layer 64 and then wet out in the same manner as layers 62, 64. Alternate layers of boat cloth and woven roving are applied to complete the joint with boat cloth as the final layer. For example, for ducts having a diameter between 8 and 20 inches, the sequence of layers is B-W-B as in FIG. 5, the sheeting width is about 6 inches, and about 0.63 pounds per foot of duct circumferential perimeter of resin is used. For ducts having a diameter between 22 and 40 inches, the sequence of layers is B-W-B-W-B, the sheeting width is about 6 inches, and about 0.75 pounds/foot of resin is used. For ducts having a diameter between 42 and 60 inches, the sequence of layers is B-W-B-W-B-W-B, the sheeting width is about 6 inches, and about 0.88 pounds/foot of resin is used.

III. PREFERRED RESIN COMPOSITIONS

A. AL-133 Resin Composition

Table 1 shows the composition of a first resin, AL-133, that can be used as the resin component in sealant 50. AL-133 is formulated by using chemicals provided by the manufacturers listed in Table 1. AL-133 includes by weight: 39.5% aromatic epoxide resin; 40.0% Heloxy 48 which is an aliphatic trifunctional epoxy; 20.0% SU-2.5 Epon novolac epoxy resin; and 0.5% γ-glycidoxypropyltrimethoxy silane.

TABLE 1

| AL-133 Resin Composition | | |
|---|---|---|
| Component | Manufacturer | Pctage |
| Aromatic Epoxide | CVC Specialty Chemicals, Cherry Hill, NJ | 39.5 |
| Heloxy 48 | Shell Chemical Co. Houston, TX | 40.0 |
| SU-2.5 Epon Resin | Shell Chemical Co. Houston, TX | 20.0 |
| Silane | OSI Specialties, Inc. Sistersville, WV | 0.5 |

B. AL-165 Resin Composition

Table 2 shows the composition of a second resin, AL-165, that can be used as the resin component in sealant 50. AL-165 is formulated by using chemicals provided by the manufacturers listed in Table 2. AL-165 includes by weight: 48.0% Epon 862 novolac epoxy resin; 51.5% SU-2.5 Epon novolac epoxy resin; and 0.5% γ-glycidoxypropyltrimethoxy silane.

TABLE 2

AL-165 Resin Composition

| Component | Manufacturer | Pctage |
| --- | --- | --- |
| Epon Resin 862 | Shell Chemical Co. Houston, TX | 48.0 |
| SU-2.5 Epon Resin | Shell Chemical Co. Houston, TX | 51.5 |
| Silane | OSI Specialties, Inc. Sistersville, WV | 0.5 |

C. AL-190 Resin Composition

Table 3 shows the composition of a third resin, AL-190, that can be used as the resin component in sealant 50. AL-190 is formulated by using chemicals provided by the manufacturers listed in Table 3. AL-190 includes by weight: 20.0% Epon 862 novolac epoxy resin; 30.0% SU-2.5 Epon novolac epoxy resin; 20.0% Heloxy 48; 19.5% Epon 826 bisphenol A resin; 10.0% Heloxy 505 which is a multi-faceted novolac epoxy; and 0.5% γ-glycidoxypropyltrimethoxy silane.

TABLE 3

AL-190 Resin Composition

| Component | Manufacturer | Pctage |
| --- | --- | --- |
| Epon Resin 862 | Shell Chemical Co. Houston, TX | 20.0 |
| Heloxy 48 | Shell Chemical Co. Houston, TX | 20.0 |
| SU-2.5 Epon Resin | Shell Chemical Co. Houston, TX | 30.0 |
| Epon Resin 826 | Shell Chemical Co. Houston, TX | 19.5 |
| Heloxy 505 | Shell Chemical Co. Houston, TX | 10.0 |
| Silane | OSI Specialties, Inc. Sistersville, WV | 0.5 |

IV. PREFERRED HARDENER COMPOSITIONS

A. Type-A Hardener Composition

Table 4 shows the composition of a first hardener, Type-A, that can be used as the curative component in sealant 50. Type-A hardener is formulated by using chemicals provided by the manufacturers listed in Table 4. Type-A hardener includes by weight: a first cycloaliphatic amine, specifically 1,2-diaminocyclohexane, 60.0%; a second cycloaliphatic amine, specifically methylene-dicyclohexylamine, 34.0%; and 6.0% Conac 10 which is an aromatic tertiary amine, specifically 2,4,6-Tris[(dimethylamino)methyl]phenol.

TABLE 4

Type-A Hardener Composition

| Component | Manufacturer | Pctage |
| --- | --- | --- |
| Cycloaliphatic - Type 1 | Air Products Co. Allentown, PA | 60.0 |
| Cycloaliphatic - Type 2 | Air Products Co. Allentown, PA | 34.0 |
| CONAC 10 | Chempro Specialities, Inc. Roswell, GA | 6.0 |

B. Type-B Hardener Composition

Table 5 shows the composition of a second hardener, Type-B, that can be used as the curative component in sealant 50. Type-B hardener is formulated by using chemicals provided by the manufacturers listed in Table 5. Type-B hardener includes by weight: 60% 1,2-diaminocyclohexane; 34.0% methylene-dicyclohexylamine; 5.5% Conac 10; and 0.5% amino silane, specifically γ-aminopropyldimethoxy silane.

TABLE 5

Type-B Hardener Composition

| Component | Manufacturer | Pctage |
| --- | --- | --- |
| Cycloaliphatic - Type 1 | Air Products Co. Allentown, PA | 60.0 |
| Cycloaliphatic - Type 2 | Air Products Co. Allentown, PA | 34.0 |
| CONAC 10 | Chempro Specialities, Inc. Roswell, GA | 5.5 |
| Amino Silane | OSI Specialties, Inc. Sistersville, WV | 0.5 |

V. SEALANT MIXING RATIOS

Each of the six combinations of resins AL-133, AL-165, AL-190 and hardeners Type-A, Type-B is a preferred embodiment of the sealant 50. However, as detailed in Section VI infra, several embodiments are especially preferred.

Mixing ratios by weight, for alternative embodiments of sealant 50 are as follows:

133 parts of AL-133 resin to 51 parts of Type-A hardener;

133 parts of AL-133 resin to 51 parts of Type-B hardener;

100 parts of AL-165 resin to 44 parts of Type-A hardener;

100 parts of AL-165 resin to 44 parts of Type-B hardener;

100 parts of AL-190 resin to 37 parts of Type-A hardener; and 100 parts of AL-190 resin to 37 parts of Type-B hardener.

VI. ADHESIVE SHEAR STRENGTH TEST RESULTS

A. Test Procedures

In forming joint assembly 10, sealant 50 bonds to vinyl ester inner surfaces 20A, 20B of duct end portions 12A, 12B, respectively, and to outer surfaces 34A, 34B of vinyl ester collar portions 26A, 26B, respectively. Sealant 50 also bonds to outer phenolic/glass surfaces 22A, 22B of duct end portions 12A, 12B, respectively, after being applied into and around seam 40. Thus, sealant 50 bonds directly to phenolic resin-impregnated surfaces 22A, 22B, and also bonds rib 28 of collar 24 to edges 18A, 18B of end portions 12A, 12B, respectively. In laid-up joint assemblies, the resin component of sealant 50 is used for impregnating and saturating layers of boat cloth and woven roving which are wound around seam 40, and so comprises the resin matrix for successive layers of fiberglass mesh that define a circumferential joint sheath. Consequently, in comparing how strongly a particular embodiment of the sealant will bond joint assembly components depending on whether bonded surfaces are or are not first sanded, the types of bonds which must be considered are phenolic-to-epoxy novolac and vinyl-to-epoxy novolac.

Adhesive shear strength tests on double shear-type laminate specimens were performed by the Structural Composites Laboratory of the Civil Engineering Department at California State University, Long Beach. The tests were performed according to the method prescribed in ASTM D3165. In one series of tests, two sheets of phenolic resin-impregnated laminate, each approximately two feet square, were bonded together in a planar "sandwich" using one of the sealant embodiments as an adhesive, and then subjected to an increasing shearing force until failure occurred either in one or both sheets ("L"-type failure) or within the inter-sheet adhesive plane ("A"-type failure). For each embodiment, five samples were tested after their adhering surfaces were sanded using a grit 40 sanding disk, and five samples were tested without their adhering surfaces sanded. Adhesive shear strength measurements for the five samples in each group were then used to calculate a mean and a standard deviation. In a second series of tests performed under the same conditions (i.e., six sealant compositions, sanded versus unsanded, five samples per case), two sheets of vinyl resin-impregnated laminate were used.

B. Phenolic Laminates

Table 6 compares mean adhesive shear strength (in lbs/in$^2$ (psi)) and failure mode (A-type or L-type) for each embodiment bonding unsanded versus sanded phenolic resin-impregnated laminates. In almost all instances where surfaces were sanded, failure occurred in the laminate rather than the adhesive. For unsanded cases, the number of adhesive failures was higher. Regardless of the embodiment used as the adhesive, the mean value for an unsanded case was never greater than that for the corresponding sanded case. If the criterion for comparing unsanded vis-a-vis sanded shear strength performance is that the mean and standard deviation for an unsanded case be about the same as those for the corresponding sanded case, then the combinations (AL-165 resin; type-A hardener) and (AL-190 resin; type-B hardener) are especially preferred for applications where only phenolic-to-phenolic bonding is required.

TABLE 6

Phenolic Laminate Shear Test Results

| | Unsanded | | Sanded | |
|---|---|---|---|---|
| R, H | Adhesive Shear Strength (psi) | Fail Mode | Adhesive Shear Strength (psi) | Fail Mode |
| 133, A | 857 ± 147 | 5L | 893 ± 58 | 5L |
| 165, A | 836 ± 54 | 3L, 2A | 837 ± 79 | 5L |
| 190, A | 1072 ± 99 | 4L, 1A | 1109 ± 162 | 5L |
| 133, B | 924 ± 94 | 4L, 1A | 1138 ± 78 | 5L |
| 165, B | 774 ± 107 | 5L | 984 ± 86 | 5L |
| 190, B | 883 ± 39 | 5L | 892 ± 41 | 3A, 2L |

C. Vinyl Laminates

Table 7 compares mean adhesive shear strength (in lbs/in$^2$ (psi)) and failure mode (A-type or L-type) for each embodiment bonding unsanded versus sanded vinyl resin-impregnated laminates. Whether surfaces were sanded or unsanded, failure always occurred in the adhesive rather in the laminate. Regardless of the embodiment used as the adhesive, the mean value for an unsanded case was always less than that for the corresponding sanded case. Applying the same criterion for comparing unsanded vis-a-vis sanded shear strength performance, the combination (AL-133 resin; type-B hardener) is especially preferred for applications where only vinyl-to-vinyl bonding is required.

TABLE 7

Vinyl Laminate Shear Test Results

| | Unsanded | | Sanded | |
|---|---|---|---|---|
| R, H | Adhesive Shear Strength (psi) | Fail Mode | Adhesive Shear Strength (psi) | Fail Mode |
| 133, A | 1046 ± 88 | 5A | 1178 ± 168 | 5A |
| 165, A | 993 ± 108 | 5A | 1310 ± 117 | 5A |
| 190, A | 1190 ± 184 | 5A | 1444 ± 131 | 5A |
| 133, B | 1064 ± 128 | 5A | 1098 ± 121 | 5A |
| 165, B | 1034 ± 121 | 5A | 1120 ± 140 | 5A |
| 190, B | 1015 ± 109 | 5A | 1142 ± 123 | 5A |

VII. ESPECIALLY PREFERRED EMBODIMENTS FOR DUAL-LAMINATE FUME DUCT JOINTS

In the context of application as the sealant 50 for joint assembly 10 where both phenolic-to-phenolic and vinyl-to-vinyl bonding are required, the combinations (AL-190 resin; type-A hardener) and (AL-133 resin; type-B hardener) are especially preferred because according to the shear strength tests these embodiments result in the best overall performance. The ratio of mean adhesive shear strength for unsanded compared to sanded surfaces for the (AL-190 ; type-A) embodiment is 0.97 for phenolic laminates, and 0.82 for vinyl laminates. The ratio of mean adhesive shear strength for unsanded compared to sanded surfaces for the (AL-133 ; type-B) embodiment is 0.81 for phenolic laminates, and 0.97 for vinyl laminates.

What is claimed is:

1. A circumferential joint bond for sealingly circumscribing a fume-traversable construction joint connecting opposed ends of fume-duct, polymeric fiberglass sections, the joint including unsanded, polymeric fiberglass mating surfaces, the joint bond containing:

a resin component comprising an admixture of epoxy resin and glycidyloxy silane; and a hardener component comprising an admixture of amine hardener and amino silane, the hardener component effecting cure of the resin component at ambient temperature.

2. The joint bond of claim 1, wherein the glycidoxy silane is gamma-glycidoxypropyltrimethoxy silane.

3. The joint bond of claim 1, wherein the amino silane is gamma-aminopropyltrimethoxy silane.

4. A method for constructing a circumferential joint bond for sealingly circumscribing a fume-traversable construction joint connecting opposed ends of polymeric fiberglass fume duct sections, the joint including a seam bounded by an unsanded circumferential outer surface, the method comprising:

forming an ambient curable and flowable mixture by mixing and blending an admixture of epoxy resin and glycidoxy silane with an admixture of amine hardener and amino silane;

applying a first layer of said curable mixture to said unsanded circumferential outer surface;

sequentially wrapping multiple layers of fiberglass mesh about the first layer of curable mixture applied to the circumferential outer surface, and saturating each successive layer with the curable mixture; and permitting the curable mixture to solidify and harden.

5. The method of claim 4, wherein the glycidoxy silane is gamma-glycidoxypropyltrimethoxy silane and the amino silane is gamma-aminopropyltrimethoxy silane.

6. The method of claim 4, wherein the curable mixture further comprises at least one constituent enhancing flame-retardancy and smoke-retardancy.

7. The method of claim 4, wherein the curable mixture is devoid of volatile organic solvents.

8. The method of claim 4, wherein the epoxy resin has a molecular weight from about 300 to about 3,000, an epoxide equivalent from about 125 to about 300, and functionality from about 1.8 to about 6.0.

9. The method of claim 4, wherein the epoxy resin and amine hardener are present in said mixture in about stoichiometric proportions.

10. A method for joining a first mating surface of a polymeric fiberglass section to another polymeric fiberglass section having a second mating surface adapted to fit together with and be joined to the first mating surface, in the formation of a construction joint for connecting opposed ends of polymeric fiberglass fume-duct sections, which comprises:

forming an ambient curable and flowable epoxy adhesive by mixing and blending an admixture of epoxy resin and glycidoxy silane with an admixture of amine hardener and amino silane;

applying said epoxy adhesive, without sanding, to at least one of said polymeric fiberglass mating surfaces;

joining said mating surfaces in contact relationship; and maintaining said contact relationship until said epoxy adhesive cures to a set.

11. The method of claim 10 wherein said glycidoxy silane is a glycidoxyalkyltrialkoxy silane.

12. The method of claim 11 wherein said glycidoxy silane is gamma-glycidoxypropyltrimethoxy silane.

13. The method of claim 10 wherein the amino silane is gamma-aminoalkyltrialkoxy silane.

14. The method of claim 13 wherein the amino silane is gamma-aminopropyltrimethoxy silane.

* * * * *

UNITED STATES PATENT AND TRADEMARK OFFICE
CERTIFICATE OF CORRECTION

PATENT NO. : 5,549,949
DATED : August 27, 1996
INVENTOR(S) : Williams, et al.

It is certified that error appears in the above-indentified patent and that said Letters Patent is hereby corrected as shown below:

Column 1, Lines 26 and 27: Delete "PATENT" and bridge line 27 to line 26.

Column 1, Lines 50 and 51: Delete "PATENT" and bridge line 51 to line 50.

IN THE CLAIMS:

Col. 10, Claim 1, numbered Line 35: Change "glycidyloxy" to --glycidoxy--.

Signed and Sealed this

Third Day of December, 1996

Attest:

BRUCE LEHMAN

Attesting Officer                Commissioner of Patents and Trademarks